(12) United States Patent
Francovich, Jr.

(10) Patent No.: US 10,681,857 B1
(45) Date of Patent: Jun. 16, 2020

(54) TWO-HANDLED HOLE DIGGER AND BLADES FOR USE WITH HOLE DIGGER

(71) Applicant: Samuel Boyd Francovich, Jr., Reno, NV (US)

(72) Inventor: Samuel Boyd Francovich, Jr., Reno, NV (US)

( * ) Notice: Subject to any disclaimer, the term of this patent is extended or adjusted under 35 U.S.C. 154(b) by 0 days.

(21) Appl. No.: 16/385,832

(22) Filed: Apr. 16, 2019

(51) Int. Cl.
*A01B 1/04* (2006.01)
*A01C 5/02* (2006.01)
*E21B 11/00* (2006.01)
*A01B 1/02* (2006.01)

(52) U.S. Cl.
CPC .............. *A01C 5/02* (2013.01); *A01B 1/024* (2013.01); *A01B 1/04* (2013.01); *E21B 11/005* (2013.01)

(58) Field of Classification Search
CPC .. A01B 1/02; A01B 1/04; A01B 1/165; A01B 1/18; A01B 1/024; A01C 5/02; E21B 11/005
USPC ........................................ 294/50.8, 50.9, 60
See application file for complete search history.

(56) References Cited

U.S. PATENT DOCUMENTS

| | | | |
|---|---|---|---|
| 92,198 A * | 7/1869 | Lyman | |
| 126,941 A * | 5/1872 | Earle | |
| 199,501 A * | 1/1878 | Bowman | |
| 283,282 A * | 8/1883 | Rogers | |
| 659,518 A * | 10/1900 | Estlack | |
| 857,182 A * | 6/1907 | Lancaster | |
| 931,061 A * | 8/1909 | Hardy | |
| 1,051,029 A * | 1/1913 | Stephanus | F24B 15/10 294/11 |
| 1,983,815 A * | 12/1934 | Schmiett | A01C 5/02 47/1.01 R |
| 2,028,680 A * | 1/1936 | Mayeda et al. | A01B 1/18 294/50.8 |
| 4,135,751 A | 1/1979 | Gederos | |
| 4,334,583 A | 6/1982 | Parker | |
| D287,218 S | 12/1986 | Portz | |
| D311,853 S | 11/1990 | Stormsgaard | |
| 5,320,363 A | 6/1994 | Burnham | |
| 5,533,578 A | 7/1996 | Powell | |
| 5,669,648 A | 9/1997 | Luck | |
| D391,130 S | 2/1998 | Martin | |
| D401,125 S | 11/1998 | Bonnes et al. | |
| 5,951,077 A | 9/1999 | Dahill | |
| 5,964,299 A | 10/1999 | Padgett | |
| 6,068,315 A | 5/2000 | Vaughter | |
| 6,178,731 B1 | 1/2001 | Forbes | |
| 6,439,629 B1 | 8/2002 | Bieth | |
| D495,568 S | 9/2004 | Register | |
| 6,837,528 B1 | 1/2005 | Britt | |

(Continued)

*Primary Examiner* — Dean J Kramer
(74) *Attorney, Agent, or Firm* — Armstrong Teasdale LLP

(57) ABSTRACT

A hole digger is provided. The hole digger includes a first handle assembly and a second handle assembly. The first handle assembly includes a first grip, a first intermediate portion, and a first blade. The first intermediate portion extends between the first grip and the first blade. The second handle assembly including a second grip, a second intermediate portion, and a second blade. The second intermediate portion extends between the second grip and the second blade. The second handle assembly is pivotally coupled to the first handle assembly such that a front surface of the first blade faces a front surface of the second blade. The first blade is not identical to the second blade.

20 Claims, 3 Drawing Sheets

(56) References Cited

U.S. PATENT DOCUMENTS

| | | |
|---|---|---|
| 7,104,576 B1 | 9/2006 | Dorr |
| 7,290,814 B2 | 11/2007 | Lipscomb et al. |
| D606,817 S | 12/2009 | Boies |
| 7,647,703 B2 * | 1/2010 | Demar .................... A01O 5/02 |
| | | 111/106 |
| 7,726,714 B2 | 6/2010 | Norton et al. |
| 8,141,924 B2 | 3/2012 | Albin |
| D657,640 S | 4/2012 | Mikel |
| 8,291,995 B1 | 10/2012 | Stoklasa |
| 8,388,031 B1 | 3/2013 | Zang |
| 8,511,729 B2 | 8/2013 | Friedli |
| 8,579,342 B2 | 11/2013 | Norton et al. |
| 9,192,087 B2 | 11/2015 | Mathieu |
| 9,320,187 B2 | 4/2016 | Scolari et al. |
| 9,504,196 B2 | 11/2016 | Hudson et al. |
| 9,526,196 B2 | 12/2016 | Park et al. |
| D775,501 S | 1/2017 | Marron |
| 9,681,597 B1 | 6/2017 | Henshaw |
| 9,689,137 B2 | 6/2017 | Matson |
| 2003/0010537 A1 * | 1/2003 | Swartz ................. E21B 11/005 |
| | | 175/293 |
| 2011/0005360 A1 | 1/2011 | Birch |
| 2014/0300120 A1 | 10/2014 | McEwen et al. |

\* cited by examiner

TWO-HANDLED HOLE DIGGER AND BLADES FOR USE WITH HOLE DIGGER

BACKGROUND

The field of this disclosure relates generally to hole diggers and, more particularly, to blades used with manually-operated hole diggers.

Generally there are two main types of hole diggers for making post holes in the ground. The first is powered by a power source and usually includes an auger type bit that rotates into the ground. The powered type usually makes an easy task of drilling a hole and removing the dirt and rock from the hole. However, the use of powered hole diggers may be limited as such diggers are usually expensive and require some sort of fuel to operate. Most fossil fuels are hazardous, combustible, and can be messy to use.

The second type of hole diggers are manually-operated and are formed in a two-blade clamping style with a handle attached to each of the two identical blades. Known blades are typically 6-8 inches long and are pivotally coupled together. The blades are driven into the ground by holding the handles parallel and striking the ground with the tips of the blades. The user then pulls the handles away from each other to force the blades to move towards each other, such that dirt is collected between the opposing blades. The user must hold the handles away from each other under tension in order not to release the material collected between the blades as the blades are removed from the hole being dug.

Manual hole diggers may also be limited in their use. For example, it may be difficult to penetrate hardened or rocky soil using conventional post hole diggers that include identical rounded shovel tips. A post hole digger is structured to dig a hole having a generally narrow cross-sectional area relative to the depth of the hole and a diameter that is slightly larger than the post being inserted into the hole. To dig a hole with a larger diameter generally requires a worker to "carve away" at the sides and edges of the perimeter of the hole being dug, such that the overall cross-sectional area of the hole is increased. The worker must then remove the dirt that falls into the hole. However, depending on the hardness of the soil, carving away the sides of the hole may be difficult. In addition, as the size of the hole is increased, the range of motion that the worker must act during each cycle may increase. Using a hole digger with longer handles may allow the worker to remove dirt from a deeper hole without bending over. However, increasing the size of the post hole digger may also increase its overall weight and thus may increase the amount of effort required by the worker. The energy to be expended by the worker generally depends on several factors including the weight of the post hole digger, the force required to operate the post hole digger, the amount of dirt collected during each cycle, and the range of motion through which a worker must act during each cycle.

There is a need for an improved manually-operated hole digger that is able to penetrate deeper through hardened or rocky in a manner that reduces the effort to be expended by the worker as compared to conventional hole diggers. In addition, there is a need for a hole digger that enables a worker to more easily remove more dirt and debris from the hole being dug during each cycle as compared to a conventional hole digger.

BRIEF DESCRIPTION

In one aspect, a hole digger is provided. The hole digger includes a first handle assembly and a second handle assembly. The first handle assembly includes a first grip, a first intermediate portion, and a first blade. The first intermediate portion extends between the first grip and the first blade. The second handle assembly including a second grip, a second intermediate portion, and a second blade. The second intermediate portion extends between the second grip and the second blade. The second handle assembly is pivotally coupled to the first handle assembly such that a front surface of the first blade faces a front surface of the second blade. The first blade is not identical to the second blade.

In another aspect, a pair of blades a for use with a dual-handled hole digger is provided. The pair of blades includes a first blade and a second blade. The first blade includes a front surface and an opposite rear surface that each extend from an upper edge to a lower edge. The lower edge of each blade is defined by at least one prong extending downward from the lower edge. The upper edge is configured to couple to a first of the hole digger handles. The second blade includes a front surface and an opposite rear surface. The front and rear surfaces extend from an upper edge to a lower edge. The upper edge is configured to couple to a second of the hole digger handles. The second blade is shaped differently than the first blade.

In a further aspect, a hole digger includes a first blade coupled to a first handle, and a second blade coupled to a second handle. The first handle is pivotally coupled to the second handle. The first blade includes a front surface and an opposite rear surface. The front surface extends laterally between a pair of opposed side edges. The front surface extends longitudinally between an upper edge and a lower edge. The lower edge is non-arcuate. The second blade includes a front surface and an opposite rear surface. The second blade front surface extends laterally between a pair of side edges. At least a portion of the second blade front surface is substantially planar.

DETAILED DESCRIPTION

The following detailed description illustrates hole diggers by way of example and not by way of limitation. The description should enable one of ordinary skill in the art to make and use the hole diggers, and the description describes several embodiments of hole diggers, including what is presently believed to be the best modes of making and using the hole diggers. Exemplary covers are described herein as being useful for creating large diameter holes in hardened soil. However, it is contemplated that the hole diggers have general application to creating holes in a broad range of surfaces and in a variety of environments other than just hardened soil.

Figure 1:
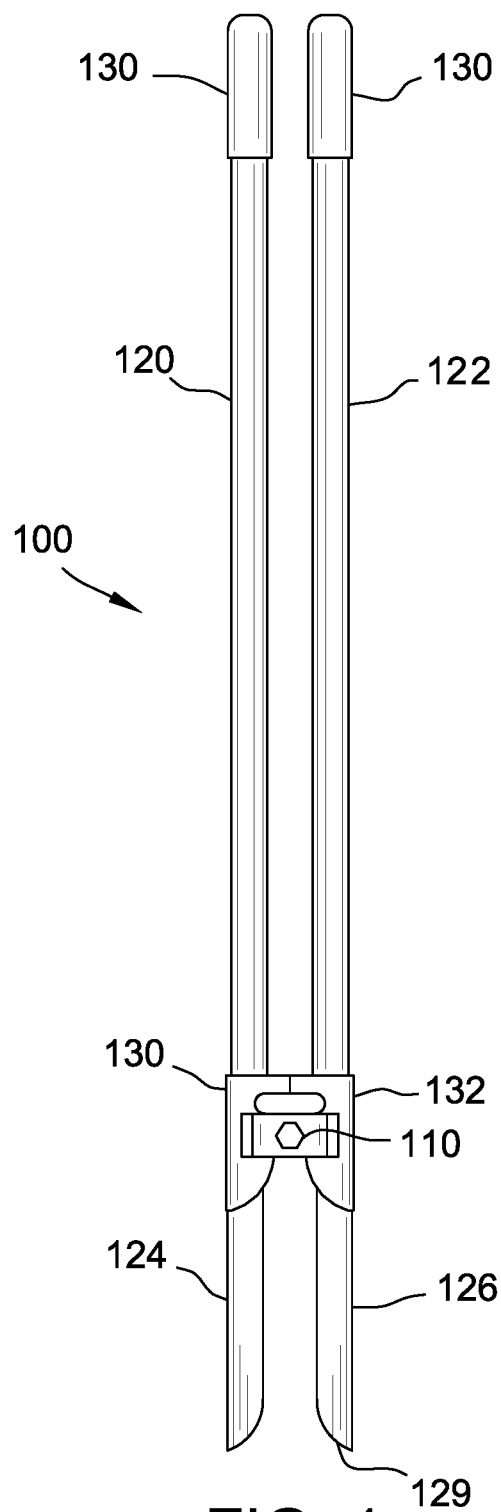
FIG. 1 is a front view of an exemplary prior art hole digger including an offset pivot.
Figure 2:
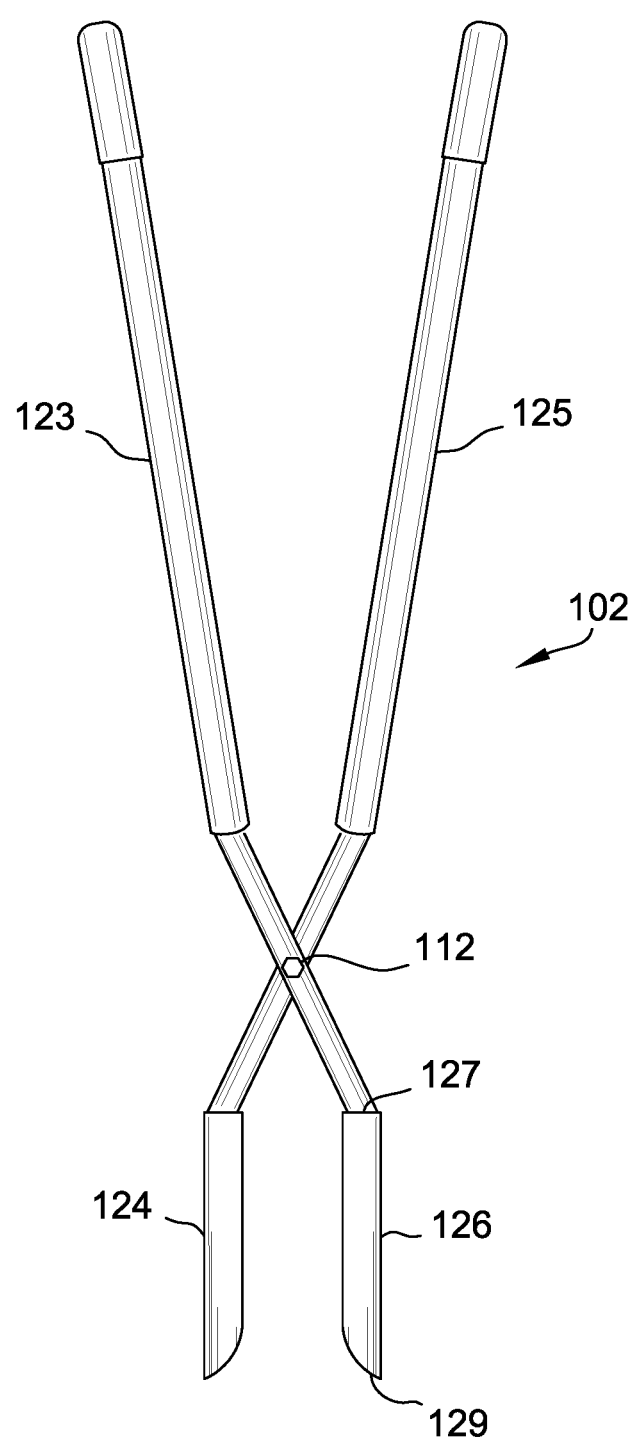
FIG. 2 is a front view of an exemplary prior art hole digger including a traverse pivot.

FIGS. 1 and 2 are schematic illustrations of exemplary known hole diggers 100 and 102, respectively. Hole diggers 100 and 102 are similar and identical components in FIG. 2 are identified using the same references numbers used in FIG. 1. More specifically, FIG. 1 illustrates a front view of a prior art hole digger 100 including an offset pivot 110, and FIG. 2 illustrates a front view of a prior art hole digger 102 including a traverse pivot 112. Each hole digger 100 and 102 is structured to dig a hole having a generally narrow cross-sectional area relative to the depth of the hole. Each hole may be dug in compacted particulate or granulated material, hereinafter referred to as "the ground". Material removed from the hole is typically a loose granulate material that is hereinafter referred to as "dirt".

Generally, manual hole diggers include two elongated handles that each include an upper hand grip portion and a blade coupled to a lower end. The handles and blades are pivotally coupled to each other at a single pivot point. The blades move between an open position and a closed position depending on a relative position of the handles to each other. When the blades are in the open position, a user may thrust the hole digger towards the ground to cause the blades to bite into the ground. To maximize the force of the bite, the user generally ensures that the hold digger is held such that the blades are generally perpendicular to the ground as the ground is struck. To further maximize the force of the ground strike, hole diggers are designed such that the handles are generally vertically aligned with the blades so that substantially all of the worker's downward force is directed directly through the blades and into the ground. This orientation also enables the worker to position their hands and wrists in a comfortable position, generally parallel to the ground. After the blades engage the ground, the worker moves the handles together to cause the blades to move into the closed position. During this motion, dirt may be separated from the ground. The closing force acting on the blades is directly related to the amount of force applied to the handles. Force applied to the handles is generally enhanced by the length of the lever arm created by the length of the handle. After the blades have been closed, the worker, while holding the blades in the closed position, lifts the hole digger thereby removing the dirt from the hole The quantity of dirt removed by the blades in the closed position is at least partially determined by the shape of the blades and the nature of the dirt. Typically, the blades are elongated and have an arcuate cross-sectional shape. Moreover, generally known hole digger blades are smooth and terminate in a pointed end. Other known hole digger blades are smooth and terminate in a generally squared-off end. Furthermore, the edges of the blades are generally shaped so that, when the blades were in the closed position, the blades can substantially enclose a quantity of dirt. The shape of the blades is also related to the configuration of the pivot point and the handles. That is, for example, if the blades are spaced far apart, e.g., to engage a greater quantity of dirt, the handles would have to travel through a greater arc in order to close the blades. However, a greater arc requires a wider hole and more effort by the worker. Lengthening the blades reduces the amount of travel required to close the blades, but also reduces the relative lever arm between the blades and the handles, thus increasing an amount of effort required by the worker.

In the exemplary embodiment of FIG. 1, each hole digger 100 includes a pair of identical handles 120 and 122, and 123 and 125, respectively, that are each between five to six feet in length, and blade members 124 and 126 that are approximately 18 inches long. In the exemplary embodiment, blades 124 and 126 are identical and are coupled together in a mirrored relationship. More specifically, in each embodiment, blades 124 and 126 extend approximately 6-8 inches long from an upper end 127 to a smooth, rounded lower end 129.

In FIG. 1, an offset pivot point 110 is defined between blades 124 and 126, and handles 120 and 122. In FIG. 2, a traverse pivot point 112 is between blades 124 and 126, and handles 123 and 125. More specifically, in FIG. 1, each handle 120 and 122 or blade 124 and 126 includes a tab 130 and 132 that extends towards the other handle 122 and 120 or blade 126 and 124 with a pivot point 110 positioned thereon. Pivot point 110 is near an interface defined between each handle 120 and 122 and respective blade member 124 and 126. Tabs 130 and 132 provide a separation between handles 120 and 122 when hole digger 100 is in the open position. In the exemplary embodiment, when in the open position, handles 120 and 122 are about six inches apart and a longitudinal axis of each handle 120 and 122 is generally aligned with a longitudinal axis for each associated blade member 124 and 126.

Because handles 120 and 122 are coupled by an offset pivot point 110, a hand grip portion 130 of each respective handle 120 and 122 is on the same side of pivot point 110, as each respective blade 124 and 126. To close blades 124 and 126, the worker separates handles 120 and 122 apart forcing blades 124 and 126 closer together along lower edges 132 and 134. To open the blades 124 and 126, handles 120 and 122 must be moved towards each other until the handles 124 and 126 are generally parallel to each other.

Because of traverse pivot point 112, hole digger 102 has a scissor-like configuration such that pulling handles 123 and 125 apart results in blades 124 and 126 moving apart and, conversely, moving handles 123 and 125 together results in blades 124 and 126 moving together. Pivot point 112 is located generally near a lower end of the handles 123 and 125, but above blades 124 and 126. Blades 124 and 126 are generally oriented at an angle relative to the longitudinal axis of handles 123 and 125 to enable blades 124 and 126 to be positioned generally perpendicular to the ground while separated apart. As a result, because of the location of pivot point 112 relative to handles 123 and 125, the range of motion of digger 102 is generally less as compared to that of hole digger 100.

When using hole digger 102, a worker pushes handles 123 and 125 together to close blades 124 and 126. While this could be considered an advantage, this motion is also the opposite of the motion generally associated with a hole digger. As such, some workers do not care for a traverse pivot point hole digger. This configuration also has a disadvantage in that, when thrusting digger 102 downwardly, the worker must hold handles 123 and 125 within a generally narrow range of separation in order for the blades 124 and 126 to be maintained generally perpendicular to the ground during the thrusting. This also limits an overall diameter of a hole being done and forces the worker's hands to be in an awkward position during the thrusting. That is, with digger 102, the worker's hands are generally at an angle relative to the ground during thrusting.

Regardless of the configuration of the digger, known hole diggers, such as diggers 100 and 102, are not designed nor capable of easily creating a larger diameter hole, such as would be necessary in planting a larger tree. Thus, one factor in the design of a hole digger is the span of the hole digger (i.e., the distance between the handles) as the digger is inserted into the ground and, as dirt is removed from the hole. For example, generally a hole digger with longer handles generally has a longer lever arm and, therefore, also has a greater closing force on the blade members. However, increasing the length of the handles also increases the weight of the hole digger and/or may make the hole digger too heavy to lift repeatedly and/or too unwieldy to use comfortably. In addition, depending on the hardness and/or compactness of the soil being dug into, it may be difficult using known hole diggers to thrust the blades into the ground. Moreover, known hole diggers may have difficulty digging holes in ground that contains rocks and/or tree roots as known smooth bottom-edged blades may glance off or not be able to pass such impediments in a hole being dug. Lastly, depending on the composition and/or water content in the ground being dug, soil being removed from a hole may clump and stick against the blades as they are lifted from a hole. As a result, the weight of the hole digger may be increased greatly, thus increasing an amount of effort required by the worker and increasing the difficulty in digging the hole.

Figure 3:
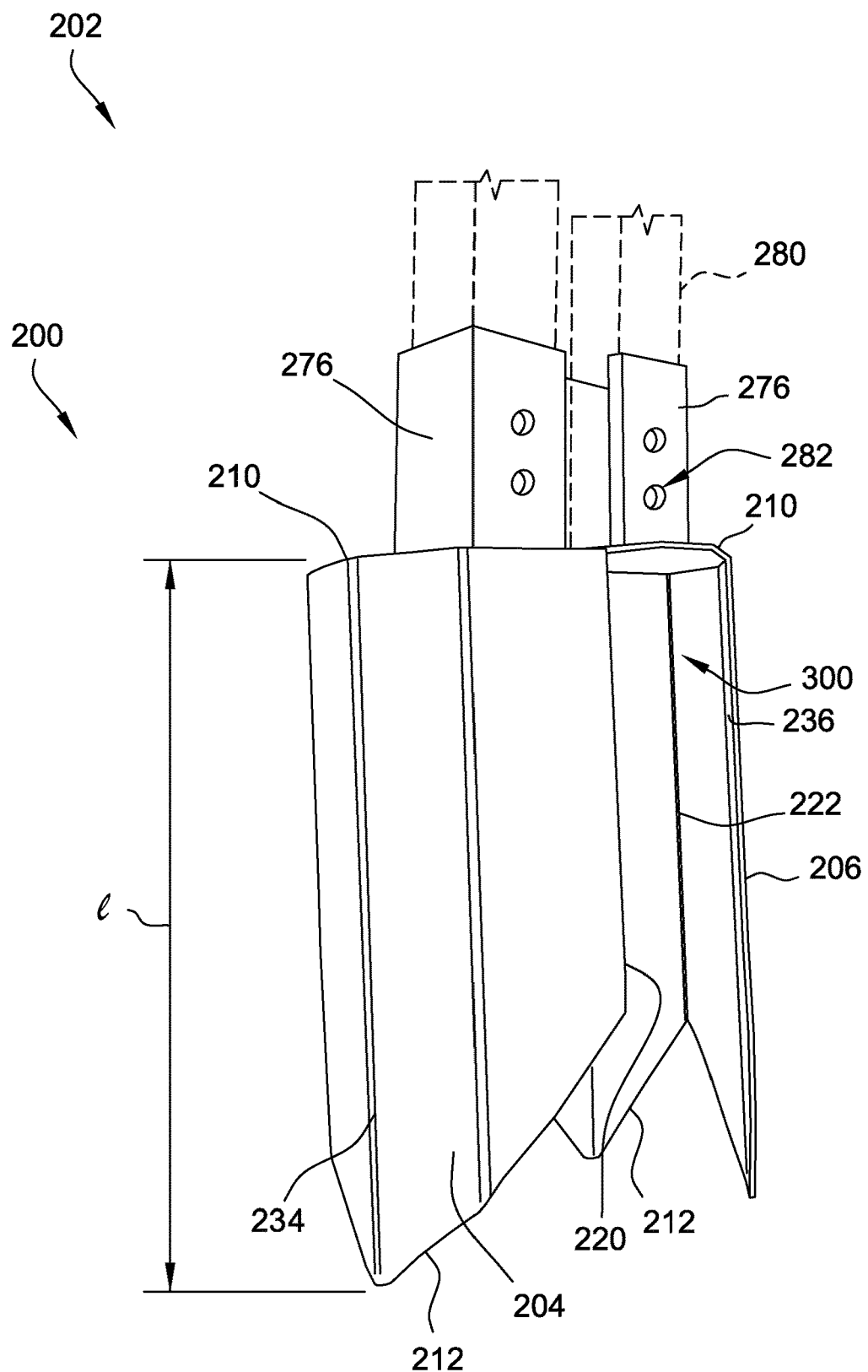
FIG. 3 is a perspective view of a lower portion of a hole digger including a pair of blades.
Figure 4:
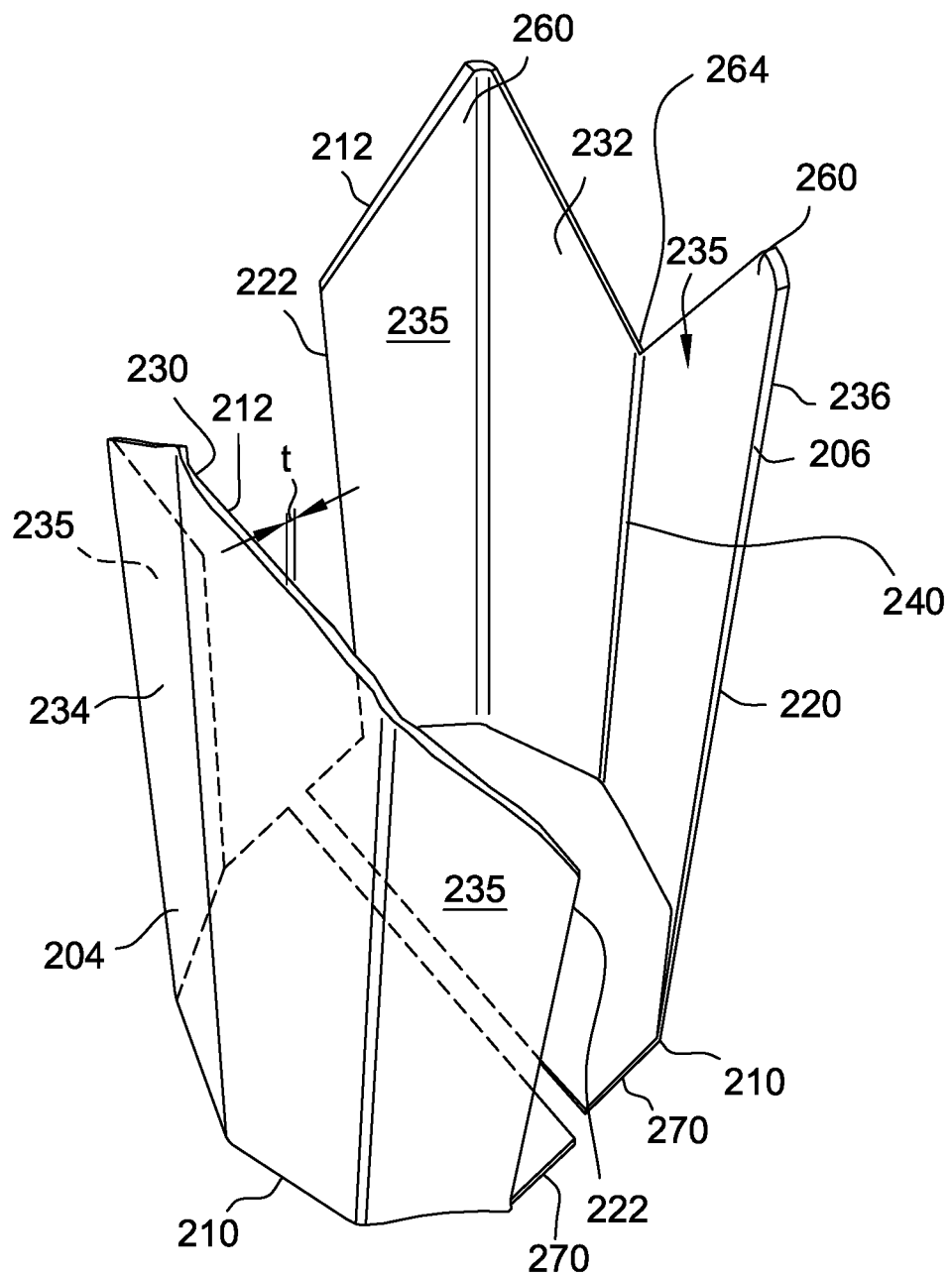
FIG. 4 is a perspective inverted view of the blades used with the hole digger shown in FIG. 3.

FIG. 3 is a perspective side view of a lower portion 200 of a hole digger 202 including a pair of blades 204 and 206. FIG. 4 is a perspective inverted view of blades 204 and 206. Blades 204 and 206 are not identical and each extends longitudinally from an upper edge 210 to a lower edge 212. In the exemplary embodiment, blades 204 and 206 are formed with approximately the same length e measured from upper edge 210 to lower edge 212. Blade length e is variably selected based on the application and the hole being dug. For example, in the exemplary embodiment, blade length e is approximately fourteen inches. In other embodiments, blade length e is at least ten inches long.

Blades 204 and 206 extend laterally between a pair of opposed side edges 220 and 222. In the exemplary embodiment, edges 220 and 222 are substantially parallel and each is generally linear. Alternatively, edges 220 and 222 may be non-parallel and/or one or both may include arcuate portions or projections. Moreover, in some embodiments, edges 220 and/or 222 may include teeth or indentations formed thereon.

Blades 204 and 206 each include a respective front surface 230 and 232, and an opposite rear surface 234 and 236. Front surfaces 230 and 232, and rear surfaces 234 and 236 are each bounded by edges 220, 222, 210, and 212. In the exemplary embodiment, neither front surface 230 or 232 extends arcuately between side edges 220 and 222. Rather, as described in more detail below, each front surface 230 and 232 is defined by at least one substantially planar portion 235. In the exemplary embodiment, each blade 204 and 206 has approximately the same thickness t measured between each front surface 230 and 232 and each respective rear surface 234 and 236. As such, in the exemplary embodiment, neither rear surface 234 or 236 extends arcuately between side edges 220 and 222. Alternatively, either blade 204 and/or 206 may be formed with a varied thickness t. In another embodiment, blades 204 and 206 may be formed with different thicknesses t.

In the exemplary embodiment, blades 204 and 206 are each defined by four planar portions 235. Alternatively, blade 204 or 206 may have more or less than four planar portions 235. For example, in some embodiments, blade 204 or 206 includes at least one planar portion 235 extending from at least one arcuate portion (not shown). In each embodiment, blades 204 and 206 each include at least one planar portion 235. In the exemplary embodiment, planar portions 235 on each blade 204 and 206 extend obliquely from each other. Moreover, on each blade 204 and 206 each planar portion 235 extends from lower edge 212 to upper edge 210. In alternative embodiments, at least one planar portion on blade 204 and/or 206 extends only partially towards upper edge 210 from lower edge 212.

Blade surface 230 and/or 232 may be formed from a single piece of material that is bent to form a desired shape for blade 204 and/or blade 206. Alternatively, blade surface 230 and/or 232 may be formed by coupling at least two planar portions 235 together. The angular profile of blades 204 and 206 as defined by planar sections 235 facilitates increasing the structural strength of blades 204 and 206 as compared to known blades that have an arcuate profile. In particular, the angular profile facilitates reducing flexing of blades 204 and/or 206 during use. In one embodiment, blade 204 and/or 206 includes at least one stiffener (not shown) that extends at least partially from lower edge 212 towards upper edge 210. In embodiments that include stiffeners, the stiffeners are positioned at interfaces 240 defined between adjacent planar portions 235 and along front surfaces 230 and 232, and/or along rear surfaces 234 and 236. The stiffeners may extend from upper edge 210 to lower edge 212, or may extend only partially between upper and lower edges 210 and 212, respectively.

In the exemplary embodiment, each blade lower edge 212 is non-arcuate and is defined by at least one prong 260 extending downwardly. More specifically, in the exemplary embodiment, blade 204 includes one prong 260 and blade 206 includes a pair of prongs 260. Alternatively, blade 204 may include more than one prong 260 and/or blade 206 may include more or less than two prongs 260. A relative location and size of prongs 260 is variable. In the exemplary embodiment, the prong 260 on blade 204 is substantially centered between edges 220 and 222. Moreover, on blade 206, the prongs 260 are symmetrically oriented such that a trough 264 is defined between the adjacent prongs 260. In the exemplary embodiment, prongs 260 are each triangular-shaped. In other embodiments, prongs 260 may have any other non-arcuate shape that enables prongs 260 to function as described herein. Moreover, in the exemplary embodiment, each prong 260 is formed from at least two planar portions 235. Alternatively, at least one prong 260 may extend from only one planar portion 235.

In the exemplary embodiment, a foot pad 270 extends substantially perpendicularly from each upper edge 210. In alternative embodiments, at least one blade 204 and/or 206 does not include a foot pad 270. More specifically, in the exemplary embodiment, each foot pad 270 extends radially inwardly from upper edge 210 and is sized to receive a user's foot during use of hole digger 202 as described in more detail below. In the exemplary embodiment, a handle coupler adaptor 276 is coupled to or is formed with foot pad 270. Adaptor 276 enables blades 204 and/or 206 to couple to hole digger handles 280. A location of adaptor 276 relative to each blade 204 and/or 206 may be varied depending on the type of hole digger 202 being used (i.e., digger with offset pivot point, digger with traverse pivot point, etc.). In the exemplary embodiment, blades 204 and/or 206

In the exemplary embodiment, each adaptor 276 includes at least one opening 282 formed therein that enables handles 280 to be removably coupled with fasteners (not shown) to blades 204 and/or 206. In alternative embodiment, handles 280 may be secured to blades 204 and/or 206 using any other mechanical coupling methods including but not limited to rivets, welding, or adhesive. As such, blades 204 and/206 may be exchanged or replaced depending on their wear and/or the intended use. Similarly, in some embodiments, the adaptor may also be coupled to each blade with a mechanical fastener that enables the blades to be easily replaced or exchanged.

During use, handles 280 are coupled to blades 204 and 206 to form hole digger 202. More specifically, when assembled, blades 204 and 206 face each other and in a "clam-shell" orientation such that a cavity 300 is at least partially defined therebetween. In one embodiment, cavity 300 is approximately nine inches across. In addition to increasing the structural integrity of each blade 204 and/206, the angular profile defined along blade inner surface 230 and 232 by planar portions 235 facilitates material sliding off surfaces 230 and/or 232 rather than enabling material to stick to either surface 230 and/or 232 as material is removed from a hole being dug. More specifically, voids are formed along each surface 230 along each interface 240 between the dirt and surfaces 230 and/or 232 as blades 204 and 206 are forced into the ground. The voids created enable material to easily slide off blades 204 and 206 and from cavity 300 as material is removed from the hole being dug.

Blades 204 and 206 provide several advantages as compared to known hole digger blades. For example, because blade lower edges 212 include at least one prong 260, blades 204 and 206 penetrate easier and deeper into the area being dug as compared to known blades having smooth lower edges. Moreover, the prongs 260 facilitate a worker using less effort when using hole digger 202 as compared to known hole diggers.

In addition, because blades 204 and 206 are shaped differently—in shape and possibly in size-the performance of hole digger 202 is enhanced as compared to known hole diggers. Specifically, during use in soil that contains rocks, the two prongs 260 extending from blade 206 enable material, such as rocks, to shift side-to-side relative to blade 206 and/or towards blade 204. Such movement facilitates dislodging obstacles, such as rocks and/or roots for example, from a hole being dug. Moreover, when a root is struck in a hole being dug, hole digger 202 may be rotated to ensure that the root is "captured" between the two prongs 260 extending from blade 206 such that it can be cut. When using known hole diggers, it is common for the hole digger to glance off a side of the root and/or for the root to shift circumferentially relative to the known hole digger blades, thus making cutting through the root difficult.

Furthermore, foot pads 270 enable a user to push downwardly on blades 204 and/or 206 towards the ground being dug during use. In fact, depending on the relative immovability, i.e., compactness and/or rockiness of the soil, and/or any obstacles in the hole being dug, a user may press downwardly on both blade foot pads 270 at the same time. Moreover, if necessary, such as if a thick root is encountered when digging a hole, a user may strike pads 270 using a sledge hammer, for example, to drive blades 204 and 206 downwardly.

As a result of blades 204 and 206, larger diameter holes, such as those needed for a plant bulb or a utility pole, for example, may be dug more easily with hole digger 202, than is generally possible using known two-handled hole diggers. More specifically, the combination of blade length e and the shape of blades 204 and 206 enables larger diameter holes to be dug more easily. More specifically, the shape of blades 204 and 206 allows a worker to more easily carve away dirt from the sides of a hole being dug using prongs 260, thus increasing the overall cross-sectional area of the hole being dug. In a general sense, blade 206 functions similarly to a shovel, while blade 204 functions similarly to a pick.

The hole diggers and blades described herein facilitate digging holes in a more efficient manner than is possible with existing two-handled hole diggers. For example, the blades described herein are easily coupled to and removed from the hole digger handles. Moreover, because the blades are non-identical, the blades may be variably selected based on the type of ground being dug in. As such, in one embodiment, a first blade includes two prongs while the second blade includes only one. As such, the amount of effort that must be expended by a user to penetrate hardened soil is diminished as compared to known two-handled hole diggers. In addition, the blades described herein are formed with substantially planar portions that create voids that facilitate preventing material removed from a hole from sticking to the blades. Furthermore, the blades described herein have a longer length that enables the hole digger described herein to dig deeper holes without as much effort or time as is required with known two-handled hole diggers.

Exemplary embodiments of two-handled hole diggers and blades used with the same are described above in detail. The described herein are not limited to the specific embodiments described herein, rather some components of the hole diggers and/or blades may be utilized independently and separately from other components and steps described herein. For example, the blades described herein may have other applications, such as, but not limited to, being used with other digging equipment. Rather, the blades described herein can be implemented and utilized in connection with various other industries.

While the invention has been described in terms of various specific embodiments, those skilled in the art will recognize that the invention can be practiced with modification within the spirit and scope of the claims.

What is claimed is:

1. A hole digger comprising:
    a first handle assembly comprising a first grip, a first intermediate portion, and a first blade, said first intermediate portion extending between said first grip and said first blade; and
    a second handle assembly comprising a second grip, a second intermediate portion, and a second blade, said second intermediate portion extending between said second grip and said second blade, said second handle assembly pivotally coupled to said first handle assembly such that a front surface of said first blade faces a front surface of said second blade, said first blade is not identical to said second blade, wherein each of said first blade and said second blade extend from an upper surface to a lower edge, a lower end of each said handle intermediate portion couples against said blade upper surface, said first blade lower edge is formed with at least two prongs, and said second blade lower edge is formed with one prong.

2. A hole digger in accordance with claim 1, wherein at least one of said first blade and said second blade is at least partially defined by a substantially planar surface.

3. A hole digger in accordance with claim 1 wherein each said blade lower edge is non-arcuate.

4. A hole digger in accordance with claim 1 wherein at least one of said first blade and said second blade comprises a foot pad extending substantially perpendicularly from said blade upper surface towards the other of said blades.

5. A hole digger in accordance with claim 1 wherein a length of each of said first blade and said second blade measured from said upper surface to said lower edge is at least 10 inches.

6. A hole digger in accordance with claim 1 wherein each of said first blade and said second blade comprises a rear surface opposite said front surface, each of said rear and front surfaces extends longitudinally from said upper surface to said blade lower edge, each of said rear and front surfaces extends laterally from a first side edge to a second side edge, at least one of said front surfaces comprises a first planar portion coupled to a second planar portion.

7. A hole digger in accordance with claim 6 wherein said first planar portion extends obliquely from said second planar portion.

8. A hole digger in accordance with claim 1, wherein said one prong of said second blade is laterally centered on said second blade lower edge.

9. A hole digger in accordance with claim 1, wherein said at least two prongs of said first blade number two prongs.

10. A pair of blades a for use with a dual-handled hole digger, said pair of blades comprising:
   a first blade comprising a front surface and an opposite rear surface, said front and rear surfaces extending from an upper surface to a lower edge, said lower edge defined by at least two prongs extending downward from said lower edge, said upper surface configured to couple adjacent to a first of the hole digger handles; and
   a second blade comprising a front surface and an opposite rear surface, said front and rear surfaces extending from an upper surface to a lower edge, said upper surface configured to couple adjacent to a second of the hole digger handles, said second blade is shaped differently than said first blade, said second blade lower edge is formed with one prong.

11. A pair of blades in accordance with claim 10, wherein at least one of said blade front surfaces is defined by a substantially planar portion.

12. A pair of blades in accordance with claim 10, wherein at least one of said blade front surfaces is defined by at least two substantially planar portions that extend obliquely from each other.

13. A pair of blades in accordance with claim 12 wherein an interface defined between said two substantially planar portions is shaped to facilitate reducing an amount of dirt from sticking against said blade front surface.

14. A pair of blades in accordance with claim 10, wherein at least one of said first blade and said second blade further comprises a foot pad extending substantially perpendicularly to said blade front surface.

15. A pair of blades in accordance with claim 10, wherein each of said blade lower edges extends between a pair of opposed side edges extending from said blade upper surface and said blade lower edge, each said blade lower edge is non-arcuate.

16. A pair of blades in accordance with claim 10, wherein at least one of said blade front surfaces is at least eight inches long.

17. A pair of blades in accordance with claim 10, wherein said one prong of said second blade is laterally centered on said second blade lower edge.

18. A hole digger comprising:
   a first blade coupled to a first handle; and
   a second blade coupled to a second handle, said first handle pivotally coupled to said second handle, said first blade comprises a front surface and an opposite rear surface, said front surface extends laterally between a pair of opposed side edges, said front surface extends longitudinally between an upper surface and a lower edge, said lower edge is non-arcuate, said second blade comprises a front surface and an opposite rear surface, said second blade front surface extends laterally between a pair of side edges and longitudinally from an upper surface to a lower edge, at least a portion of said second blade front surface is substantially planar, wherein said first blade lower edge is formed with at least two prongs, and said second blade lower edge is formed with one prong.

19. A hole digger in accordance with claim 18 wherein each of said first blade front surface and said second blade front surface comprises a plurality of substantially planar portions extending obliquely from each other.

20. A hole digger in accordance with claim 19 wherein each of said first blade and said second blade further comprises a foot pad extending substantially perpendicularly to said front surface.

\* \* \* \* \*